United States Patent Office 3,075,986
Patented Jan. 29, 1963

3,075,986
(1-PIPERIDYLALKYL) DERIVATIVES OF 3-INDOLE
Robert Michel Jacob, Ablon-sur-Seine, and Jean Clement Fouché, Paris, France, assignors to Société des Usines Chimiques Rhône-Poulenc, Paris, France, a corporation of France
No Drawing. Filed Jan. 2, 1959, Ser. No. 784,458
Claims priority, application France Jan. 9, 1958
11 Claims. (Cl. 260—294.7)

This invention relates to new indole derivatives and to processes for their preparation.

According to the present invention there are provided new indole derivatives conforming to the general formula:

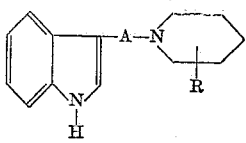

(wherein A represents a saturated divalent aliphatic hydrocarbon group containing 1 to 3 carbon atoms, and R represents a member of the class consisting of hydroxy and hydroxyalkyl groups of which the alkyl residue contains 1 to 3 carbon atoms) and their acid addition and quarternary ammonium salts.

According to a feature of the present invention, the new indole derivatives of general Formula I are prepared by the process which comprises condensing a reactive ester of the general formula:

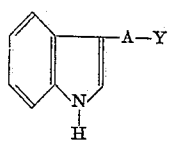

(wherein Y represents the acid residue of a reactive ester, such as a halogen atom or a sulphuric or sulphonic ester residue, and A is as hereinbefore defined) with a substituted piperidine of the general formula:

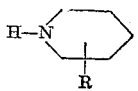

(wherein R is as hereinbefore defined) or a salt thereof. The reaction is effected by heating the reagents, preferably in an organic solvent medium (for example, ethanol) at the boiling temperature of the solvent.

According to a further feature of the invention, the new indole derivatives of general Formula I are prepared by the process which comprises reducing a quaternary ammonium derivative of a substituted pyridine of the general formula:

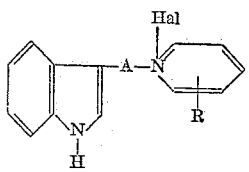

(wherein Hal represents a halogen atom and A and R are as hereinbefore defined) by known methods for the reduction of the pyridine nucleus to piperidine; in particular by the action of hydrogen in the presence of a hydrogenation catalyst such as Adams' platinum.

The pyridine starting materials of Formula IV may be prepared by heating a reactive ester of Formula II with pyridine substituted by the group R in an organic solvent such as methanol or acetone.

According to a still further feature of the invention, the indole derivatives of Formula I in which A is —CH$_2$— are prepared by the process which comprises reacting 3-dimethylaminomethylindole with a piperidine of the general formula:

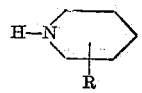

(wherein R is as hereinbefore defined).

The reaction is effected by heating the reagents in an organic solvent, for example an aromatic hydrocarbon such as toluene, preferably at the boiling point of the solvent.

According to another feature of the invention, the indole derivatives of Formula I in which R represents a hydroxyalkyl group are prepared by the process which comprises reducing an ester of the general formula:

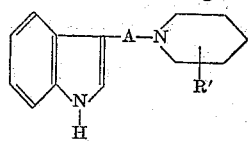

(wherein R' represents a carbalkoxy or carbalkoxyalkyl group of which the alkyl group contains 1 or 2 carbon atoms, and A is as hereinbefore defined) by known methods for the conversion of an ester grouping to —CH$_2$OH; in particular, by the action of lithium aluminium hydride, an alkali metal borohydride, or sodium and an alcohol.

According to another feature of the invention, the indole derivatives of Formula I in which the grouping R is —OH and is in the 3- or 4-position of the piperidine nucleus are prepared by the process which comprises reducing a piperidone corresponding to the general formula:

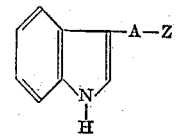

(wherein Z represents the 3-ketopiperidino or 4-ketopiperidino group, and A is as hereinbefore defined) by known methods for the conversion of the piperidone carbonyl group >C=O into a carbinol group which do not involve ring opening, for example by means of zinc dust and acetic acid.

The new indole derivatives according to the invention possess interesting pharmacodynamic properties; in particular, they have a powerful action on the central nervous system, which renders them useful as regulators of this system, e.g. as sedatives, and also substantial diuretic activity. Individual compounds of importance are 1-[2-(3-indolyl)-1-ethyl]-4-hydromethylpiperidine,
1-[2-(3-indolyl)-1-ethyl]-3-hydroxymethylpiperidine,
1-[2-(-indolyl)-1-ethyl]-2-(2-hydroxyl-1-ethyl)piperidine,
1-[2-(3-indolyl)-1-ethyl]-2-hydroxymethylpiperidine,
1-[2-(3-indolyl)-1-ethyl]-4-hydroxypiperidine,
1-[2-(3-indolyl)-1-ethyl]-4-(2-hydroxy-1-ethyl)-piperidine,
1-[2-(3-indolyl)-1-ethyl]-3-(2-hydroxy-1-ethyl)piperidine,
1-(3-indolylmethyl)-3-hydroxymethylpiperidine,
1-(3-indolylmethyl)-4-hydroxymethylpiperidine and
1-(3-indolylmethyl)-2-hydroxymethylpiperidine.

For therapeutic purposes, the bases of general Formula I are preferably employed as such or in the form of non-toxic acid addition salts, i.e. salts containing anions which are relatively innocuous to the animal organism in therapeutic doses of the salts (such as hydrochlorides and other hydrohalides, phosphates, nitrates, sulphates, maleates, fumarates, citrates, tartrates, methanesulphonates and ethanedisulphonates) so that the beneficial physiological properties inherent in the bases are not vitiated by side-effects ascribable to the anions. However, they may also be employed in the form of non-toxic quaternary ammonium salts obtained by reaction with organic halides (e.g. methyl or ethyl iodide, chloride or bromide, or allyl or benzyl chloride or bromide) or other reactive esters, e.g. toluene-p-sulphonates.

The following examples illustrate the invention.

*Example I*

1-[2-(3-indolyl)-1-ethyl]-4 - hydroxymethylpyridinium bromide (27.8 g.) is dissolved in a mixture (750 cc.) comprising 80% pure ethanol and 20% water. This solution is added to the same mixture (150 cc.) of ethanol and water containing platinum oxide (2.8 g.) previously reduced by hydrogen (Adams' platinum).

The solution, containing the suspension of platinum, is hydrogenated at ordinary pressure and temperature. The reaction ceases after the absorption of 0.228 mole of hydrogen. The catalyst is then filtered off and the solvents are driven off in vacuo. The residue is treated with water (50 cc.) and charcoal (1 g.) and, after filtration, a clear solution is obtained which is made alkaline with sodium hydroxide (d.=1.33, 10 cc.). An oil separates which crystallises when isopropanol (20 cc.) and water (100 cc.) are added. After being left for 24 hours, the crystals are separated and dried. There is obtained 1 - [2 - (3 - indolyl) - 1-ethyl]-4-hydroxymethyl-piperidine (13.7 g.), M.P. 153° C. The product is purified by crystallisation from isopropanol and then has a melting point of 157–158° C.

The starting material is obtained by heating 3-(2-bromo-1-ethyl)indole with 4-pyridylmethanol in solution in methanol for 16 hours under reflux. On cooling 1-[2-(3-indolyl)-1-ethyl]-4-hydroxymethylpyridinium bromide crystallises with methanol of crystallisation. This product has a melting point of 198° C.

*Example II*

1-[2-(3-indolyl-1-ethyl] - 3 - hydroxymethylpyridinium bromide (10.2 g.) is dissolved in a mixture (300 cc.) of 80% absolute ethanol and 20% water and added to the same mixture (100 cc.) containing Adams' platinum (1.0 g.).

The solution, containing the suspension of platinum, is hydrogenated at ordinary pressure and temperature. The reaction ceases after the absorption of 0.09 mole of hydrogen. The catalyst is then filtered off, the solvents are driven off in vacuo and the residue is dissolved in distilled water (150 cc.) and made alkaline with 5 N sodium hydroxide (20 cc.). An oil separates which is insoluble in ether and chloroform. This oil is extracted with butanol (250 cc. followed by 200 cc.). The water is removed by azeotropic distillation and the butanol solution is concentrated to 100 cc. It is then diluted with ether (600 cc.) and the solution obtained is dried over anhydrous potassium carbonate. The ether and the butanol are then removed on a water-bath, finally in vacuo. Amorphous 1-[2-(3-indolyl)-1-ethyl]-3-hydroxymethylpiperidine (7.0 g.) is obtained, which is purified by crystallisation from di-isopropyl ether and then melts at 127° C.

The starting material is obtained by heating 3-(2-bromo-1-ethyl)indole with 3-pyridylmethanol in solution in acetone under reflux for 16 hours. 1-[2-(3-indolyl)-1-ethyl]-3-hydroxymethylpyridinium bromide crystallises from the hot reaction mixture. After cooling, crystals are obtained melting at 190–191° C.

*Example III*

1-[2-(3-indolyl)-1-ethyl]-2 - (2 - hydroxyl - 1 - ethyl) pyridinium bromide (7.4 g.) is dissolved in a mixture (100 cc.) composed of 80% pure ethanol and 20% water and added to the same mixture (50 cc.) containing Adams' platinum (0.75 g.).

The solution containing the suspension of platinum is hydrogenated at ordinary pressure and temperature. The reaction ceases after the absorption of 0.06 mole of hydrogen. The catalyst is then filtered off and the solvents driven off in vacuo. The residue is treated with distilled water (100 cc.), 5 N sodium hydroxide (10 cc.) and ether (150 cc.). After decantation, the aqueous layer is washed with ether (100 cc.). The combined ethereal layers are dried over potassium carbonate and the solvents removed on the water bath. There is obtained 1 - [2 - (3-indolyl)-1-ethyl]-2-(2-hydroxy-1-ethyl) piperidine (5.4 g.), which is purified by crystallising the hydrochloride from a mixture of isoamyl alcohol and acetone. It then melts at 153–155° C.

The starting material is obtained by heating 3-(2-bromo-1-ethyl)-indole with 2-(2-hydroxy-1-ethyl)pyridine in acetone for 16 hours under reflux. After removal of the solvent, the gummy residue is terated with ethanol and 1 - [2 - (3 - indolyl) - 1-ethyl]-2-(2-hydroxy-1-ethyl) pyridinium bromide crystallises with ethanol of crystallisation. It melts at 175–177° C.

*Example IV*

3-(2-bromo-1-ethyl)indole (92%, 10.5 g.) and 2-hydroxymethyl-piperidine (12.4 g.) are dissolved in ethanol (75 cc.). The solution obtained is heated under reflux for 15 hours. The ethanol is removed in vacuo. The residue is treated with 2 N hydrochloric acid (200 cc.) and ether (200 cc.) and goes completely into solution. The aqueous solution is decanted and washed with ether (100 cc.). The hydrochloric acid liquor is made alkaline with 5 N sodium hydroxide (100 cc.). An oil separates which is extracted with butanol (300 cc. followed by 200 cc.). The water is removed by azeotropic distillation and the butanol solution is concentrated to 100 cc. It is then diluted with ether (500 cc.) and the mineral salts are precipitated. After filtration, the solution is dried over anhydrous potassium carbonate. The ether is removed on the water-bath and the residual butanol in vacuo. An oily residue (12.3 g.) comprising 1-[2-(3-indolyl)-1-ethyl]-2-hydroxymethylpiperidine with traces of butanol is obtained. The product is purified by crystallisation of the neutral fumarate from ethanol. This salt crystallises with one molecule of ethanol of crystallisation and melts at 125–130° C.

*Example V*

3-(2-bromo-1-ethyl)indole (87%, 7.73 g.) and 4-hydroxypiperidine (6 g.) are dissolved in ethanol (30 cc.). The solution obtained is heated for 14 hours under reflux. The ethanol is removed in vacuo and the residue is treated with water (15 cc.), 2 N sodium hydroxide (20 cc.) and butanol (150 cc.). The aqueous solution is decanted and washed with butanol (100 cc.). The butanol solutions are combined, dehydrated by azeotropic distillation and concentrated to 50 cc. They are then diluted with ether (500 cc.) and the mineral salts are precipitated. After filtration, the clear solution obtained is dried over anhydrous potassium carbonate. The ether is removed on the water-bath and the butanol in vacuo. There is obtained 1-[2-(3-indolyl)-1-ethyl]-4 hydroxypiperidine (8.8 g.) with traces of butanol. This product is purified by crystallisation from water in the form of a monohydrate and melts at 98–102° C.

*Example VI*

A solution of 1-[2-(3-indolyl)-1-ethyl]-4-ethoxycarbonylmethyl-piperidine (4.4 g.), M.P. 78° C., is added over 2 minutes with agitation to a suspension of lithium aluminum hydride (1.35 g.) in anhydrous ether (100 cc.). Hydrogen is liberated and an insoluble complex is formed. The reaction products are heated for two hours under reflux. After cooling, the complex is hydrolysed with water (2.7 cc.) followed by 5 N sodium hydroxide (2.7 cc.) and water (6.4 cc.), and agitation of the mixture is continued for 5 hours. The ethereal solution is filtered and the insoluble material is treated with hot methanol (150 cc.). The alumina is filtered off and the combined organic phases taken to dryness. The residue is treated with chloroform (50 cc.) and water (30 cc.). The chloroform solution is decanted, dried over anhydrous potassium carbonate and evaporated. There is obtained 1 - [2 - (3 - indolyl) - 1 - ethyl] - 4 - (2 - hydroxy - 1-ethyl)piperidine (3.2 g.), which crystallises on cooling and is purified by crystallisation from ethyl acetate. It melts at 118–119° C.

The initial 1-[2-(3-indolyl)-1-ethyl]-4-ethoxycarbonylmethylpiperidine is prepared by hydrogenation of 1-[2-(3 - indolyl) - 1 - ethyl] - 4 - ethoxycarbonylmethyl - pyridinium bromide, dissolved in a mixture comprising 80% ethanol and 20% water, in the presence of Adams' platinum at normal pressure and temperature. The product is purified by crystallisation from di-isopropyl ether and then melts at 78° C.

1 - [2 - (3 - indolyl) - 1 - ethyl] - 4 - ethoxycarbonyl - methylpyridinium bromide is itself obtained by the action of 3-(2-bromo-1-ethyl)indole on ethyl 4-pyridylacetate in solution in acetone under reflux for 16 hours. After cooling and treatment with ether the product crystallises and melts at 116–118° C.

Example VII

A solution of 1-[2-(3-indolyl)-1-ethyl]-3-methoxycarbonylmethylpiperidine (5.0 g.) in anhydrous ether (100 cc.) is added over 6 minutes with agitation to a suspension of lithium aluminum hydride (1.63 g.) in anhydrous ether (100 cc.). Hydrogen is liberated and an insoluble complex is precipitated. The reaction products are heated for two hours under reflux. After cooling, the complex is hydroylsed with water (2 cc.) followed by 5 N sodium hydroxide (2 cc.) and water (7 cc.). The mixture is agitated for two hours. The ether is filtered and the residual alumina is extracted with hot methanol (200 cc.). The organic solutions are combined and the ether is removed as well as methanol (150 cc.). The residual solution is treated with chloroform (150 cc.). The water is removed by azeotropic distillation and the mineral salts precipitate. After filtration, the chloroform solution is taken to dryness to give 1-[2-(3-indolyl)-1-ethyl]-3-(2-hydroxy-1-ethyl)piperidine (5.3 g.), which is purified by crystallisation from ethanol. It then melts at 152–153° C.

The starting material is prepared by hydrogenation of 1 - [2 - (3 - indolyl) - 1 - ethyl] - 3 - methoxycarbonyl - methylpyridinium bromide, dissolved in a mixture comprising 80% ethanol and 20% water, in the presence of Adams' platinum at ordinary pressure and temperature. The crude amorphous product is used directly in the lithium aluminum hydride reduction.

1 - [2 - (3 - indolyl) - 1 - ethyl] - 3 - methoxycarbonyl - methylpyridinium bromide is itself obtained by the action of 3-(2-bromo-1-ethyl)indole on methyl 3-pyridylacetate in solution in acetone for 16 hours under reflux. The product crystallises from the hot reaction mixture and melts at 162–163° C.

Example VIII 3-dimethylaminomethylindole (15.7 g.), 3-piperidylmethanol (10.35 g.) and anhydrous toluene (150 cc.) are heated for 17 hours under reflux. About 90% of the theoretical amount of dimethylamine is released. The toluene is evaporated in vacuo and the residue is treated with 2 N sulphuric acid (100 cc.) and ether (100 cc.). The decanted ethereal solution is washed with 2 N sulphuric acid (50 cc.). The combined acid liquors are made alkaline with an excess of concentrated aqueous sodium hydroxide. The product crystallises and the crystals are separated, washed with water, and dried. This crude product (20 g.) is recrystallised from hot ethyl acetate (130 cc.). There is obtained 1-(3-indolylmethyl)-3-hydroxymethylpiperidine (15.7 g.), M.P. 142–143° C.

Example IX 3-dimethylaminomethylindole (15.7 g.), 4-piperidylmethanol (10.35 g.) and anhydrous toluene (150 cc.) are heated under reflux for 66 hours. About 60% of the theoretical quantity of dimethyamine is liberated. The toluene is evaporated in vacuo and the residue is treated with 2 N sulphuric acid (200 cc.) and ether (200 cc.). The acid liquors are made alkaline with an excess of dilute aqueous sodium hydroxide and extracted with ether (200 cc., followed by 2 x 100 cc.). The ethereal solutions are dried over potassium carbonate and the ether evaporated off. The oily residue (21.5 g.) is dissolved in ethanol (100 cc.) and ethereal hydrogen chloride (16 cc.) (containing 5.5 moles of hydrochloric acid per litre of solution); a hydrochloride crystallises. After cooling at 0° C. for 12 hours, the crystals are separated and recrystallised from methanol (160 cc.). There is obtained 1-(3-indolylmethyl)-4-hydroxymethylpiperidine hydrochloride (9.2 g.), M.P. 240° C.

Example X 2-piperidylmethanol (17.25 g.), 3-dimethylaminomethylindole (26 g.) and anhydrous toluene (250 cc.) are poured into a 500 cc. flask provided with a reflux condenser, and are heated under reflux for 66 hours. Dimethylamine (about 50% of the theoretical amount) is liberated. On cooling, some of the unchanged 3-dimethylaminomethylindole crystallises. The crystals are separated, washed with toluene and dried. 8.5 g. of 3-dimethylaminomethylindole are recovered.

The filtrate is evaporated in vacuo. The residue is treated with 2 N sulphuric acid (200 cc.) and ether (100 cc.). The ethereal solution is decanted and washed with 2 N sulphuric acid (50 cc.). The acid liquors are collected and made alkaine with an excess of concentrated aqueous sodium hydroxide. After extraction with ether (100 cc. followed by 50 cc.), the combined ethereal liquors are dried over anhydrous potassium carbonate and evaporated. The residue (21 g.) is treated with ethanol (150 cc.) and fumaric acid (9.8 g.) under reflux. After cooling at 0° C. for 24 hours, a neutral fumarate crystallises. The crystals are separated, washed twice with ethanol (25 cc.) and dried in vacuo. There is obtained the neutral fumarate of 1-(3-indolylmethyl)-2-hydroxymethylpiperidine (9 g.) M.P. 190° C.

We claim:

1. A member of the class consisting of indole derivatives of the formula:

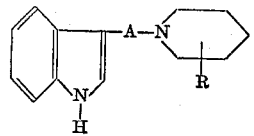

wherein A represents a divalent aliphatic hydrocarbon group selected from the class consisting of methylene and ethylene, and R represents a member of the class consisting of hydroxy and hydroxyalkyl groups of which the alkyl residue contains 1 to 2 carbon atoms, and their pharmaceutically acceptable non-toxic acid addition salts.

2. The compound 1 - [2 - (3 - indolyl) - 1 - ethyl] - 4 - hydroxymethylpiperidine.

3. The compound 1 - [2 - (3 - indolyl) - 1 - ethyl] - 3-hydroxymethylpiperidine.

4. The compound 1 - [2 - (3 - indolyl) - 1 - ethyl] - 2-(2-hydroxy-1-ethyl)piperidine.

5. The compound 1 - [2 - (3 - indolyl) - 1 - ethyl] - 2-hydroxymethylpiperidine.

6. The compound 1 - [2 - (3 - indolyl) - 1 - ethyl] - 4-hydroxypiperidine.

7. The compound 1 - [2 - (3 - indolyl) - 1 - ethyl] - 4-(2-hydroxy-1-ethyl)piperidine.

8. The compound 1 - [2 - (3 - indolyl) - 1 - ethyl] - 3-(2-hydroxy-1-ethyl)piperidine.

9. The compound 1-(3-indolylmethyl)-3-hydroxymethylpiperidine.

10. The compound 1 - (3 - indolylmethyl) - 4 - hydroxymethylpiperidine.

11. The compound 1 - (3 - indolylmethyl) - 2 - hydroxymethylpiperidine.

References Cited in the file of this patent

UNITED STATES PATENTS

| 2,708,197 | Speeter | May 10, 1955 |
| 2,804,462 | Speeter | Aug. 27, 1957 |

FOREIGN PATENTS

| 74,527 | Newfoundland | Apr. 15, 1954 |
| 74,485 | Newfoundland | Apr. 15, 1954 |

OTHER REFERENCES

Protiva et al.: Collection of Czech Chemical Communications, vol. 24: pages 3980 and 3984 relied on (1959).